(12) United States Patent
Chen et al.

(10) Patent No.: US 8,077,424 B2
(45) Date of Patent: Dec. 13, 2011

(54) TRANSDUCER DESIGN WITH A SENSOR CLOSE TO WRITE POLE

(75) Inventors: Yonghua Chen, Edina, MN (US); Kaizhong Gao, Eden Prairie, MN (US)

(73) Assignee: Seagate Technology, LLC, Scotts Valley, CA (US)

( * ) Notice: Subject to any disclaimer, the term of this patent is extended or adjusted under 35 U.S.C. 154(b) by 225 days.

(21) Appl. No.: 12/473,829

(22) Filed: May 28, 2009

(65) Prior Publication Data
US 2010/0302669 A1  Dec. 2, 2010

(51) Int. Cl.
*G11B 21/02* (2006.01)
(52) U.S. Cl. .......................................... 360/75
(58) Field of Classification Search .............. 360/31, 360/53, 68, 75, 77.06, 135, 131
See application file for complete search history.

(56) References Cited

U.S. PATENT DOCUMENTS

| | | | |
|---|---|---|---|
| 4,912,585 A | 3/1990 | Belser et al. | |
| 5,218,452 A * | 6/1993 | Kondo et al. | 386/225 |
| 5,479,696 A | 1/1996 | McNeil | |
| 5,784,224 A | 7/1998 | Rottmayer et al. | |
| 5,956,216 A * | 9/1999 | Chou | 360/131 |
| 5,999,360 A | 12/1999 | Meyer et al. | |
| 6,104,562 A | 8/2000 | Ottesen et al. | |
| 6,282,056 B1 * | 8/2001 | Feng et al. | 360/125.43 |
| 6,754,017 B2 | 6/2004 | Rettner et al. | |
| 6,920,062 B2 * | 7/2005 | Parkin | 365/158 |
| 6,947,235 B2 | 9/2005 | Albrecht et al. | |
| 6,956,707 B2 | 10/2005 | Ottesen et al. | |
| 7,027,263 B2 | 4/2006 | Ottesen et al. | |
| 7,133,229 B2 | 11/2006 | Semba | |
| 7,262,931 B2 | 8/2007 | Nakamura et al. | |
| 7,324,294 B2 | 1/2008 | Moser | |
| 2002/0071208 A1 | 6/2002 | Batra et al. | |
| 2003/0107833 A1 | 6/2003 | Rettner et al. | |
| 2006/0092541 A1 | 5/2006 | Moser | |
| 2006/0103968 A1 | 5/2006 | Jurneke | |
| 2008/0085425 A1 * | 4/2008 | Girt et al. | 428/826 |

(Continued)

FOREIGN PATENT DOCUMENTS
EP  1522991 A1  4/2005
(Continued)

OTHER PUBLICATIONS

Zhu et al., "Recording, Noise, and Servo Characteristics of Patterned Thin Film Media" IEEE Transactions on Magnetics vol. 26, No. 1, pp. 23-29 (Jan. 2000).

(Continued)

*Primary Examiner* — Fred Tzeng
(74) *Attorney, Agent, or Firm* — Ladas & Parry, LLP

(57) ABSTRACT

A magnetic device includes a read sensor, a writer and a synchronization sensor. The magnetic device is configured for writing information to and reading information from a magnetic medium that includes a plurality of discrete magnetic bits. The writer includes a write element, a first return element magnetically coupled to the write element, and a second return element magnetically coupled to the write element. The write element is positioned in between the first and second return elements. The synchronization sensor is located adjacent to the write element of the writer in a closely spaced arrangement, and is configured to generate a signal as a function of a sensed magnetic bit. The signal is used to position the writer element relative to the sensed magnetic bit.

20 Claims, 14 Drawing Sheets

U.S. PATENT DOCUMENTS

| | | | |
|---|---|---|---|
| 2009/0002867 A1 | 1/2009 | Gage et al. | |
| 2009/0002868 A1 | 1/2009 | Mallary et al. | |
| 2009/0195916 A1* | 8/2009 | Chauhan et al. | 360/77.06 |
| 2009/0316301 A1* | 12/2009 | van de Veerdonk et al. | 360/112 |
| 2010/0033872 A1* | 2/2010 | Xi et al. | 360/135 |
| 2010/0110575 A1* | 5/2010 | Gao | 360/57 |
| 2010/0246048 A1* | 9/2010 | Ranmuthu | 360/68 |

FOREIGN PATENT DOCUMENTS

| | | |
|---|---|---|
| JP | 2003281701 | 10/2003 |
| WO | WO2008107988 A1 | 9/2008 |

OTHER PUBLICATIONS

Lin et al., "Spin Stand Study of Density Dependence of Switching Proprieties in Patterned Media" IEEE Transactions on Magnetics vol. 36, No. 5, pp. 2999-3001 (Sep. 2000).

Lohau et al., "Writing and reading perpendicular magnetic recording media patterned by a focused ion beam" Applied Physics Letters vol. 78, No. 7, pp. 990-992 (Feb. 12, 2000).

International Search Report and Written Opinion from PCT Patent Application No. PCT/US2010/036561, filed May 28, 2010.

* cited by examiner

TRANSDUCER DESIGN WITH A SENSOR CLOSE TO WRITE POLE

BACKGROUND

Hard disc drives (HDDs) typically comprise one or more magnetic media discs, each disc having concentric data tracks for storing data. Where multiple discs are used, a stack is formed of co-axial discs having generally the same diameter. A transducing head carried by a slider is used to read from and write to a data track on a disc. The slider is carried by a head arm assembly (HAA) that includes an actuator arm and a suspension assembly, which can include a separate gimbal structure or can integrally form a gimbal. During operation, as the disc spins, the slider glides above the surface of the disc on a small cushion of air. The actuator arm pivots to movably position the slider with respect to the disc. A microactuator assembly can be included to provide additional precision positioning of the suspension assembly. Electrical connections extend along the suspension to electrically connect the transducing head to components located at or near the actuator arm. Those electrical connections can be formed on the suspension itself, or can be located on a separate interconnect structure supported relative to the suspension, such as a flex-on suspension (FOS).

The transducing head typically includes a single writer and a single reader. The reader includes a sensor for retrieving magnetically encoded information stored on the disc (or other magnetic storage media). Magnetic flux from the surface of the disc causes rotation of the magnetization vector of a sensing layer or layers of the sensor, which in turn causes a change in the electrical properties of the sensor that can be detected by passing a current through the sensor and measuring a voltage across the sensor. Depending on the geometry of the sensor, the sense current may be passed in the plane (CIP) of the layers of the sensor or perpendicular to the plane (CPP) of the layers of the sensor. External circuitry then converts the voltage information into an appropriate format and manipulates that information as necessary to recover information encoded on the disc.

The writer, for a perpendicular recording transducing head, typically includes a main pole and one or more return poles, which are separated from each other at an air bearing surface (ABS) of the transducing head by gap layers. The main pole and return poles can be connected to each other at a region distal from the ABS by a back gap closer or back via, in some configurations. One or more layers of conductive coils are positioned between the main and return poles, and are encapsulated by insulating layers. To write data to the disc (or other magnetic media), an electric current is applied to the conductive coils to induce a magnetic field in the disc under a pole tip of the main pole. By reversing the direction of the current through the coils, the polarity of the data written to the magnetic media is reversed, and a magnetic transition is written between two adjacent bits. A trailing edge of the main pole is used to write the data to the magnetic media.

Bit patterned media (BPM) systems can be used to store data to a patterned magnetic storage medium (e.g., disc). In a BPM system, data is stored on the disc as discrete magnetic data bits that are isolated from one another. BPM systems can allow for relative high recording densities. However, BPM systems require write synchronization. As the transducing head moves over a surface of the rotating disc, the main pole of the writer must be properly aligned with a selected bit on the disc in order to properly write to the medium. Misalignment can lead to write errors. Therefore, sensors have been proposed for sensing timing marks to synchronize energizing the writer with the arrival of a selected bit at a location adjacent to the main pole of the writer.

Timing variations can negatively affect write synchronization. Known synchronization sensors are typically spaced from the main pole at relatively large distances. For instance, a synchronization sensor that is spaced approximately 6 μm from a main pole of a writer utilized with a disc having a bit length of less than about 20 nm can encompass 300 or more magnetic transitions in the magnetic medium within that space, which tends to increase a risk of synchronization error. In addition, each component in the BPM system can introduce some timing error in making synchronization determinations. For instance, skew angle can exacerbate spacing issues between a synchronization sensor and a main pole of a writer. Variations due to manufacturing tolerances can produce variable spacing of bits on the patterned storage medium. Thermal expansion and other environmental factors can also affect timing variations, such as the thermal effects upon electrical traces that affect signals sent to and from the transducing head to achieve write synchronization. The factors that affect write synchronization could be easily compensated for if the timing variations were deterministic. However, these variations tend to be random, which makes precise synchronization sensing important.

The present invention relates to an alternative apparatus and method for write synchronization with BPM systems.

SUMMARY

A magnetic device includes a read sensor, a writer and a synchronization sensor. The magnetic device is configured for writing information to and reading information from a magnetic medium that includes a plurality of discrete magnetic bits. The writer includes a write element, a first return element magnetically coupled to the write element, and a second return element magnetically coupled to the write element. The write element is positioned in between the first and second return elements. The synchronization sensor is located adjacent to the write element of the writer in a closely spaced arrangement, and is configured to generate a signal as a function of a sensed magnetic bit. The signal is used to position the writer element relative to the sensed magnetic bit.

DETAILED DESCRIPTION

In general, the present invention provides a synchronization sensor closely spaced to a write pole of a writer of a transducing head, which is configured to write to a patterned magnetic storage medium (e.g., a disc of a hard disc drive system). The synchronization sensor permits determination of write timing for synchronization of writer operation with writer pole tip arrival at a selected bit location on the patterned magnetic storage medium. The patterned magnetic storage medium can be configured for use in a bit patterned media (BPM) system in which data is stored on the patterned magnetic storage medium as discrete magnetic data bits that are isolated from one another. Moreover, the present invention provides a method of operation in which the writer can operate simultaneously with the synchronization sensor, and magnetization of the writer pole tip sensed by the synchronization sensor can be filtered out during the process of determining proper write timing. Thus, according to the present invention, write synchronization for BPM systems can compensate for random variations within the system in order to help improve writing performance.

Figure 1:
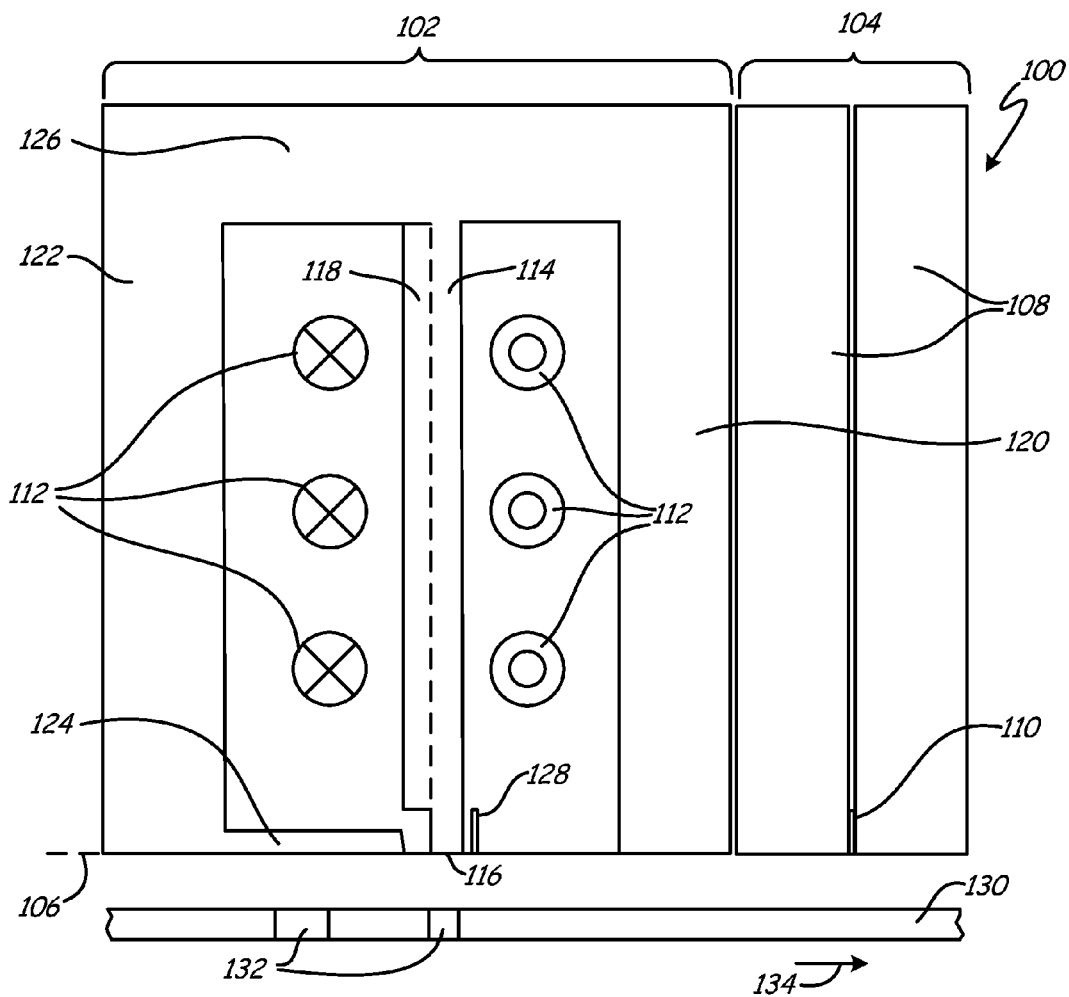
FIG. 1 is a schematic side view of an embodiment of a transducing head according to the present invention.
Figure 2:
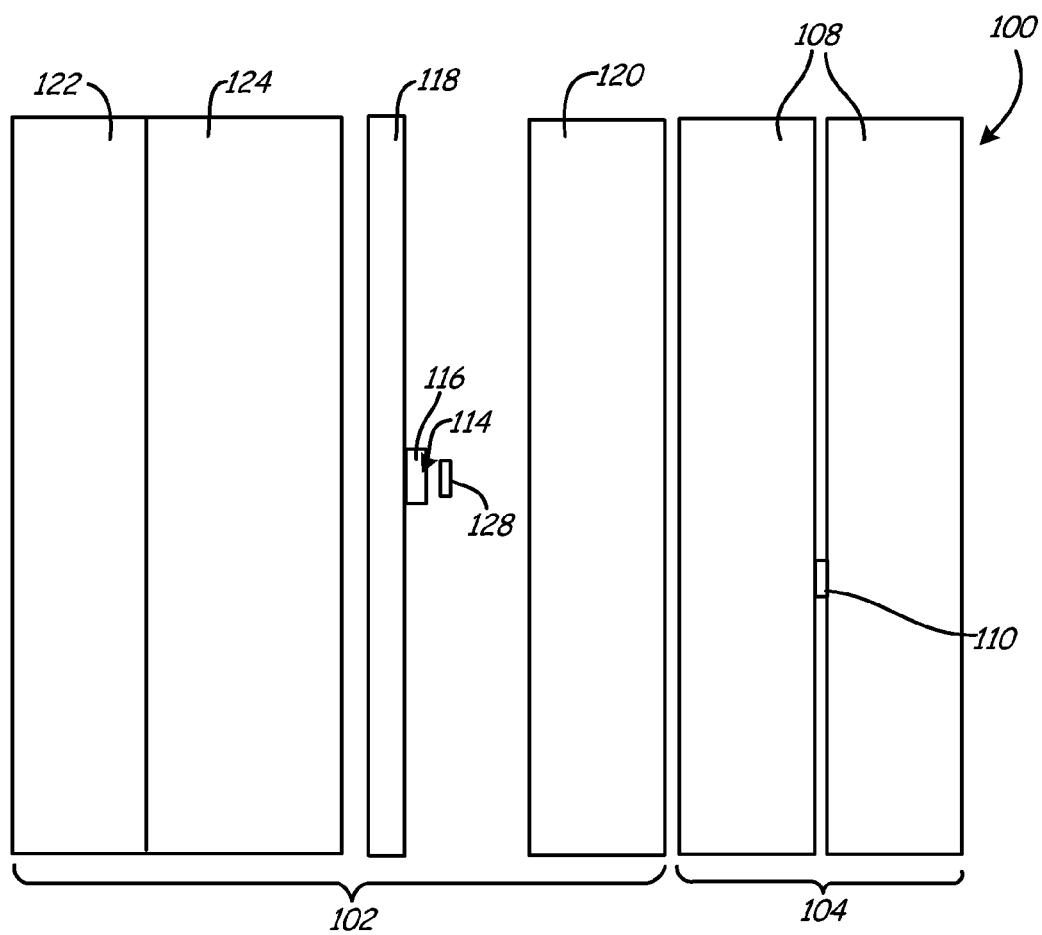
FIG. 2 is an air bearing surface (ABS) view of the embodiment of the transducing head of FIG. 1.

FIG. 1 is a schematic side view of an embodiment of a transducing head 100 that includes a writer 102 and a reader 104 both positioned along an air bearing surface (ABS) 106. FIG. 2 is an ABS view of the transducing head 100. As shown in FIGS. 1 and 2, the reader 104 includes a pair of shields 108 and a read sensor 110 located between the shields 108 at the ABS 106. The reader 104 can function in a conventional manner for reading information from a storage medium.

The writer 102 includes magnetization coils 112, a main pole 114 that defines a pole tip 116 at the ABS 106, a yoke layer 118, a bottom return pole 120, a top return pole 122, a front shield 124, and a back via (or back closer) 126. The main pole 114 is positioned in between the bottom and top return poles 120 and 122, and the yoke layer 118 is located immediately adjacent to the main pole 114 facing the top return pole 122. The back via 126 connects the bottom and top return poles 120 and 122, the main pole 114 and the yoke layer 118. The magnetization coils 112 are positioned about the main pole 114 and the yoke layer 118, such that energizing the magnetization coils 112 can induce a magnetic field in the main pole 114 during operation. The front shield 124 extends from the top return pole 122 along the ABS 106 toward the main pole 114.

A synchronization sensor 128 is positioned in the writer 102 at the ABS 106. The synchronization sensor is located in between the bottom and top return poles 120 and 122, and more particularly in between the bottom return pole 120 and the main pole 114. The synchronization sensor 128 is closely spaced from the main pole 114. In the illustrated embodiment, the synchronization sensor can be spaced from the main pole 114 by a distance in a range of approximately 30 nm to approximately 4 μm. Other spacing ranges are possible in alternative embodiments. As shown in FIG. 2, the synchronization sensor 128 is substantially aligned with the main pole 114 of the writer 102 in a cross-track direction. It should be noted that the synchronization sensor 128 would be connected to external circuitry through one or more electrical leads not shown in FIGS. 1 and 2. The synchronization sensor 128 can be a magnetoresistive sensor of any type (e.g., a tunneling magnetoresistive sensor, a giant magnetoresistive sensor, a spin valve sensor), a Hall-effect sensor, an extraordinary Hall-effect sensor, etc.

A patterned magnetic storage medium 130 (e.g., a patterned magnetic storage disc) is shown in FIG. 1 positioned adjacent to the transducing head 100, generally parallel to the ABS 106. The storage medium 130 has data tracks patterned with discrete, isolated magnetic bits 132 used to store data for bit patterned media (BPM) recording. The storage medium 130 can move (e.g., rotate) in a direction 134 relative to the transducing head 100. The synchronization sensor 128 can be used to sense a position of a selected bit 132 (or a corresponding timing mark) and generate an output signal that, in turn, is used to determine write timing synchronization for the writer 102. This write timing synchronization helps ensure that the magnetization coils 112 are energized for writing to the selected bit 132 at the precise moment the selected bit arrives at a location aligned with the pole tip 116 of the main pole 114. The synchronization sensor 128 thereby provides feedback to compensate for random variations within the system during operation. Examples of variations within the system include variations due to skew angle, temperature, bit spacing, transducing head fabrication tolerances, etc. A method of operation for writing data to a patterned magnetic storage medium with a transducing head according to the present invention is explained further below.

Figure 3:
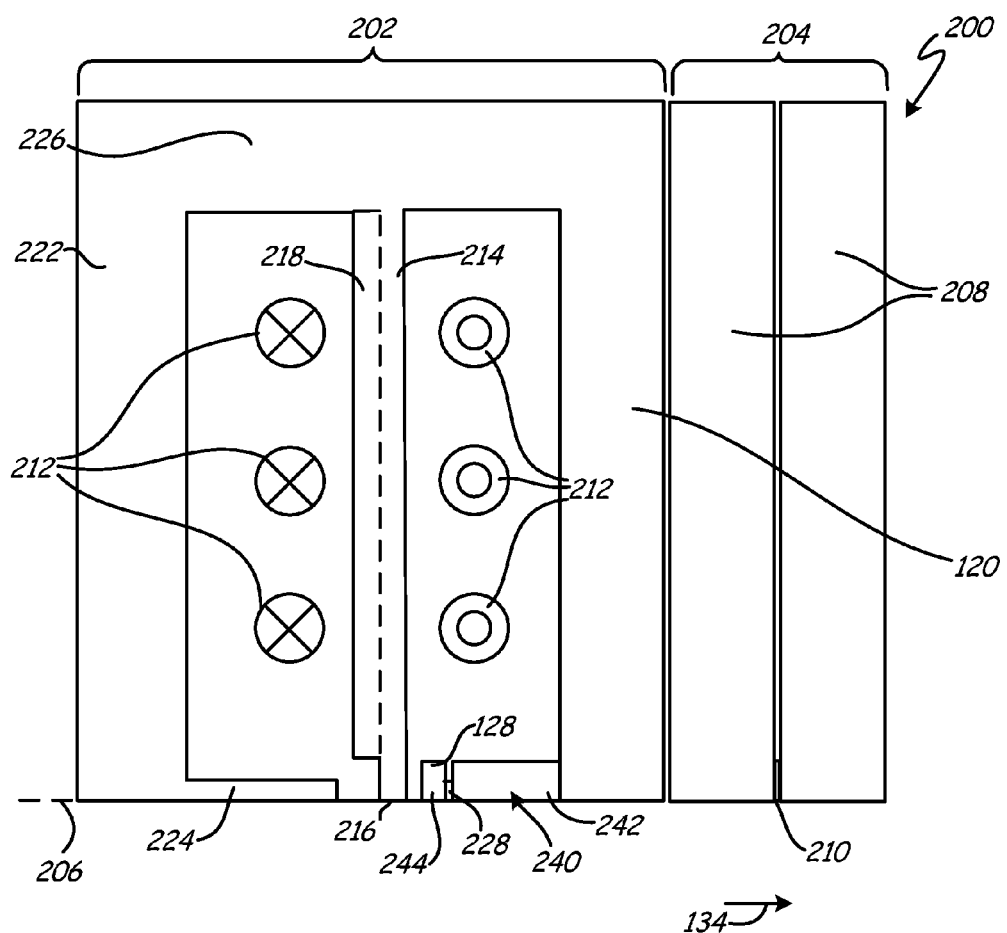
FIG. 3 is a schematic side view of an embodiment of the transducing head.
Figure 4:
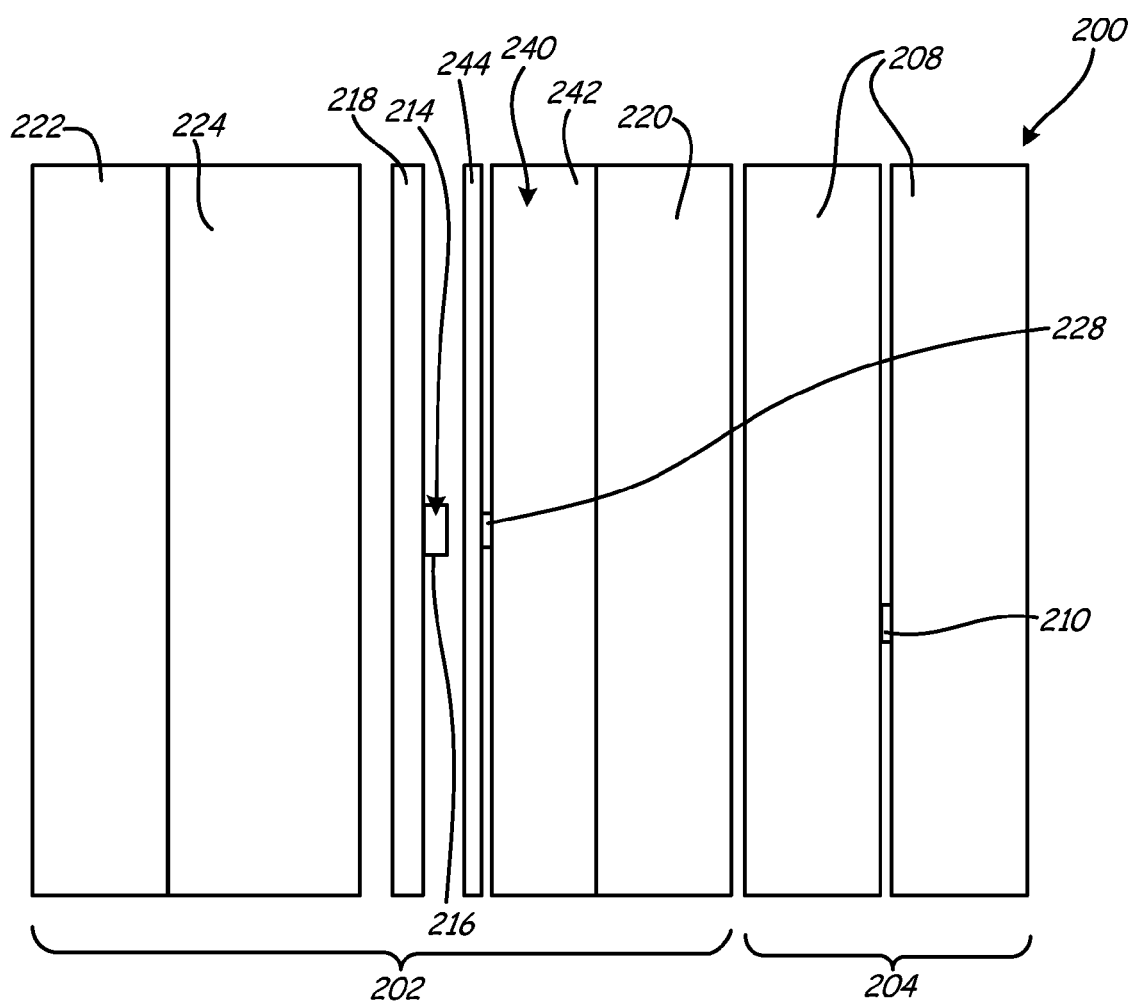
FIG. 4 is an ABS view of the embodiment of the transducing head of FIG. 3.

FIG. 3 is a schematic side view of an embodiment of a transducing head 200, and FIG. 4 is an ABS view of the transducing head 200. Components in the transducing head 200 are generally similar to those of the transducing head 100 described above and are designated with similar reference numbers having numerical values increased by one hundred. A writer 202 of the transducing head 200 further includes a leading shield 240 extending from a bottom return pole 220 toward a main pole 214. The leading shield 240 includes a first portion 242 and a second portion 244. A synchronization sensor 228 is positioned in between the first and second portions 242 and 244 of the leading shield 240. In the illustrated embodiment, the first and second portions 242 and 244 of the leading shield 240 are discontinuous, and abut two opposing sides of the synchronization sensor 228, leaving four sides of the synchronization sensor 228 uncovered by material of the leading shield 240. The leading shield 240 can provide shielding to the synchronization sensor 228 during operation. The synchronization sensor 228 is closely spaced from the main pole 214 of the writer 202.

Figure 5:
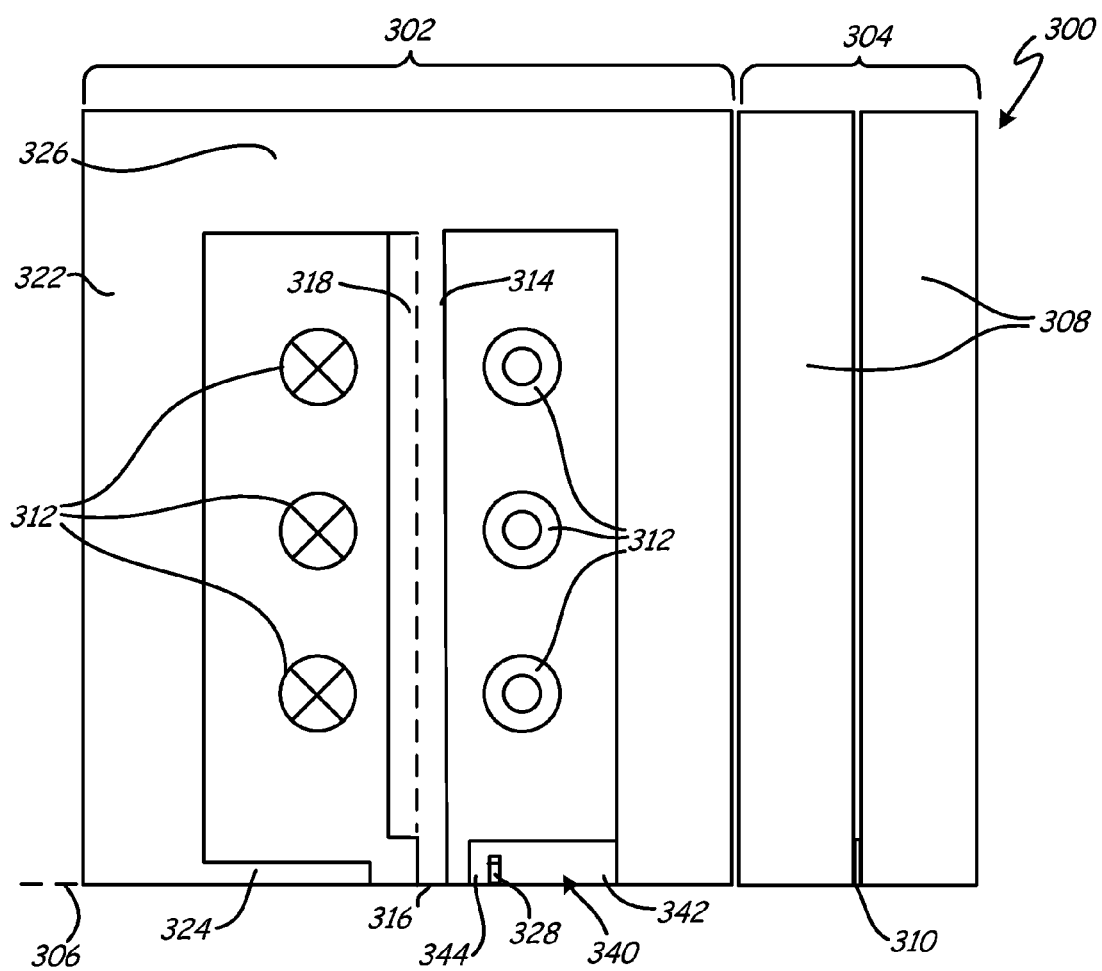
FIG. 5 is a schematic side view of an embodiment of the transducing head.

FIG. 5 is a schematic side view of an embodiment of a transducing head 300. Components in the transducing head 300 are generally similar to those of the transducing head 200 described above and are designated with similar reference numbers having numerical values increased by one hundred. However, in the transducing head 300 a synchronization sensor 328 is positioned in a leading shield 340 of a writer 302 with material of the leading shield 340 substantially covering all sides of the synchronization sensor 328 except along the ABS 306 (e.g., abutting five sides of the synchronization sensor 328). First and second portions 342 and 344 of the leading shield 340 are contiguous. One or more electrical leads (not shown) can penetrate the leading shield 340 to electrically connect the synchronization sensor 328 to external circuitry. The synchronization sensor 328 is closely spaced from a main pole 314 of the writer 302.

Figure 6A:
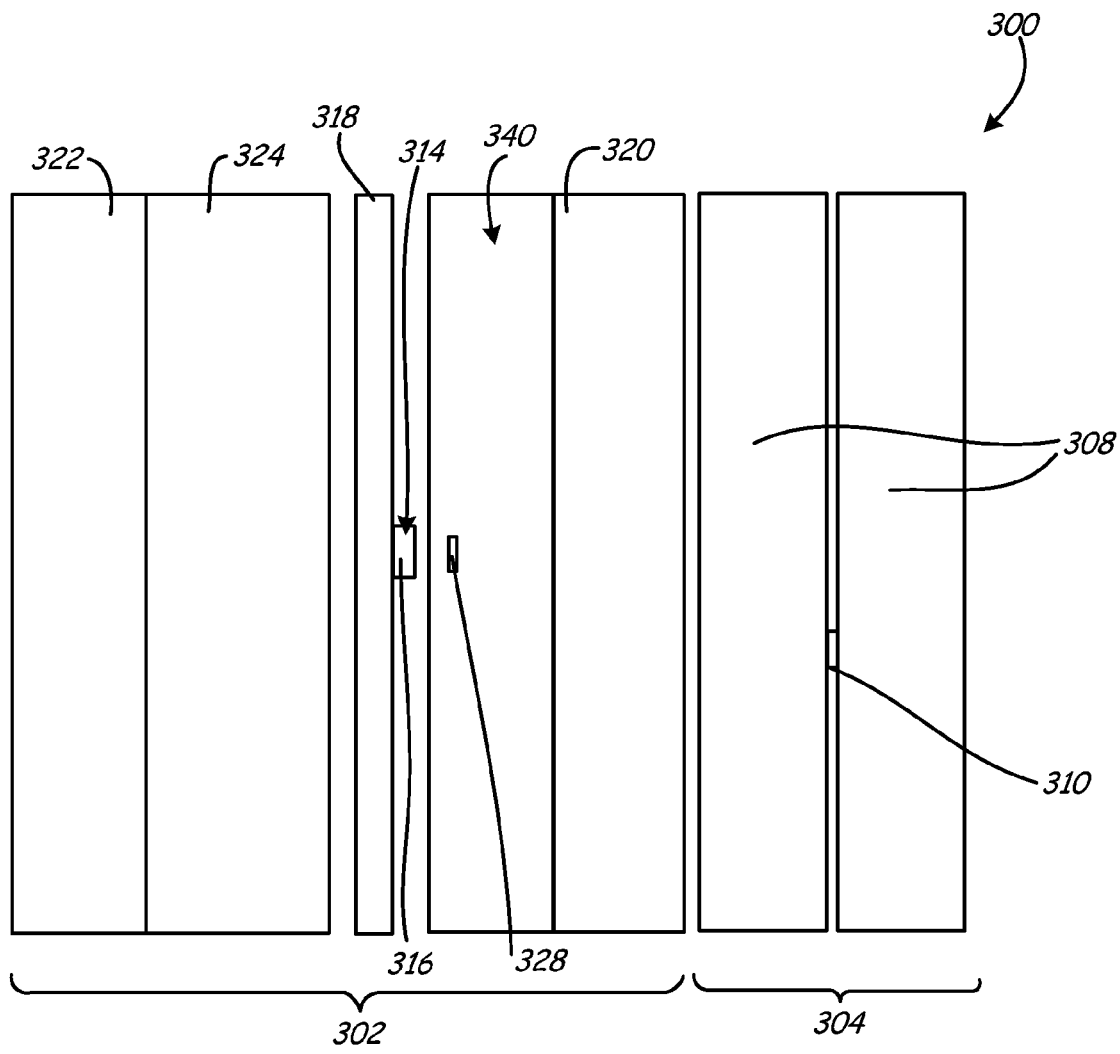
FIG. 6A is an ABS view of one configuration of the embodiment of the transducing head of FIG. 5.
Figure 6B:
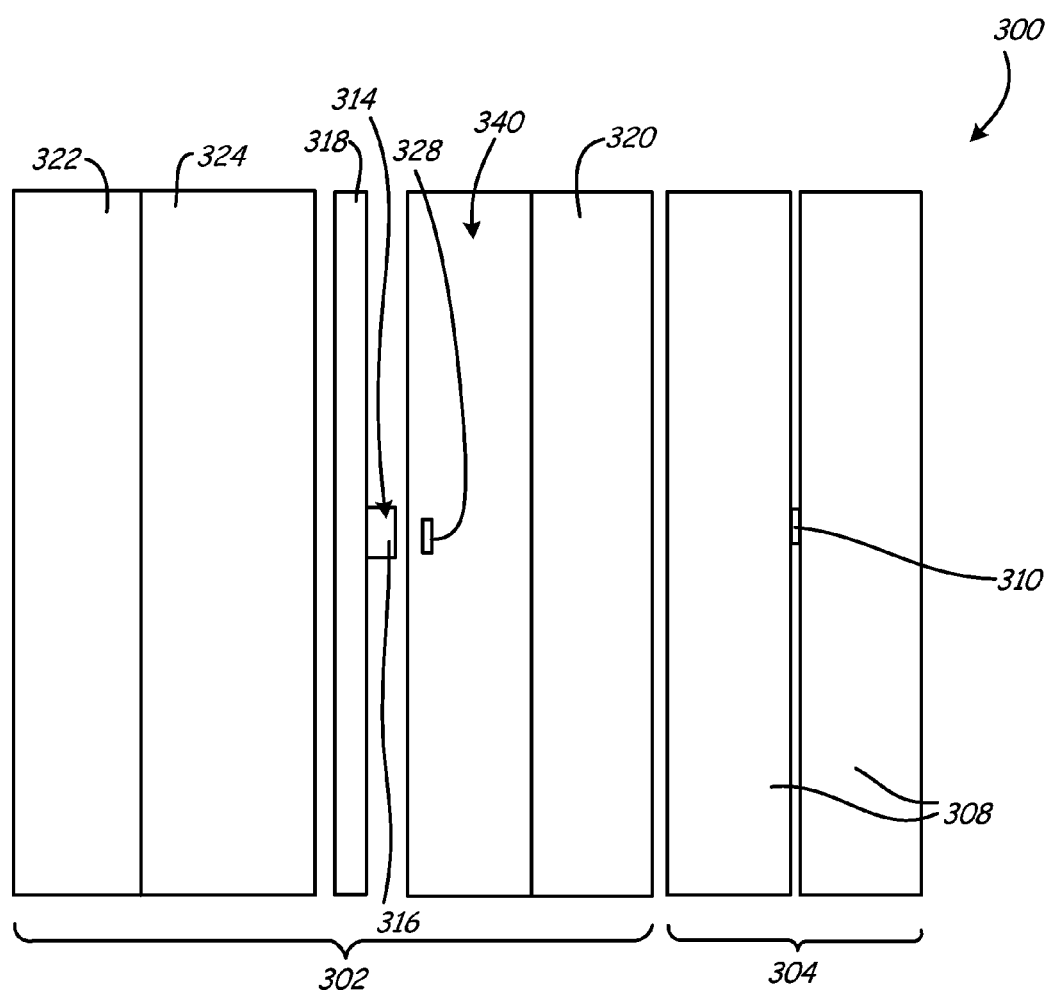
FIG. 6B is an ABS view of an alternative configuration of the embodiment of the transducing head of FIGS. 5 and 6A.

The arrangement of a read sensor 310 of a reader 304 relative to a main pole of the writer 302 and to the synchronization sensor can vary as desired. FIG. 6A is an ABS view of one configuration of the transducing head 300 in which the synchronization sensor 328 is substantially aligned with the main pole 314 of the writer 302 in a cross-track direction but the read sensor 310 is not aligned with the synchronization sensor 328 in the cross-track direction. This configuration can simplify fabrication, by reducing alignment demands over the relatively large spacing distances between the synchronization sensor 328 and the read sensor 310. FIG. 6B is an ABS view of an alternative configuration of the transducing head 300 in which the synchronization sensor 328, the main pole 314 of the writer 302 and the read sensor 310 are all substantially aligned in a cross-track direction. This alternative configuration can help reduce a need for repositioning of the transducing head 300 between reading and writing operations. It should further be noted that a read sensor can be aligned with a synchronization sensor in any a transducing head having nearly any writer and synchronization sensor configuration.

Figure 7:
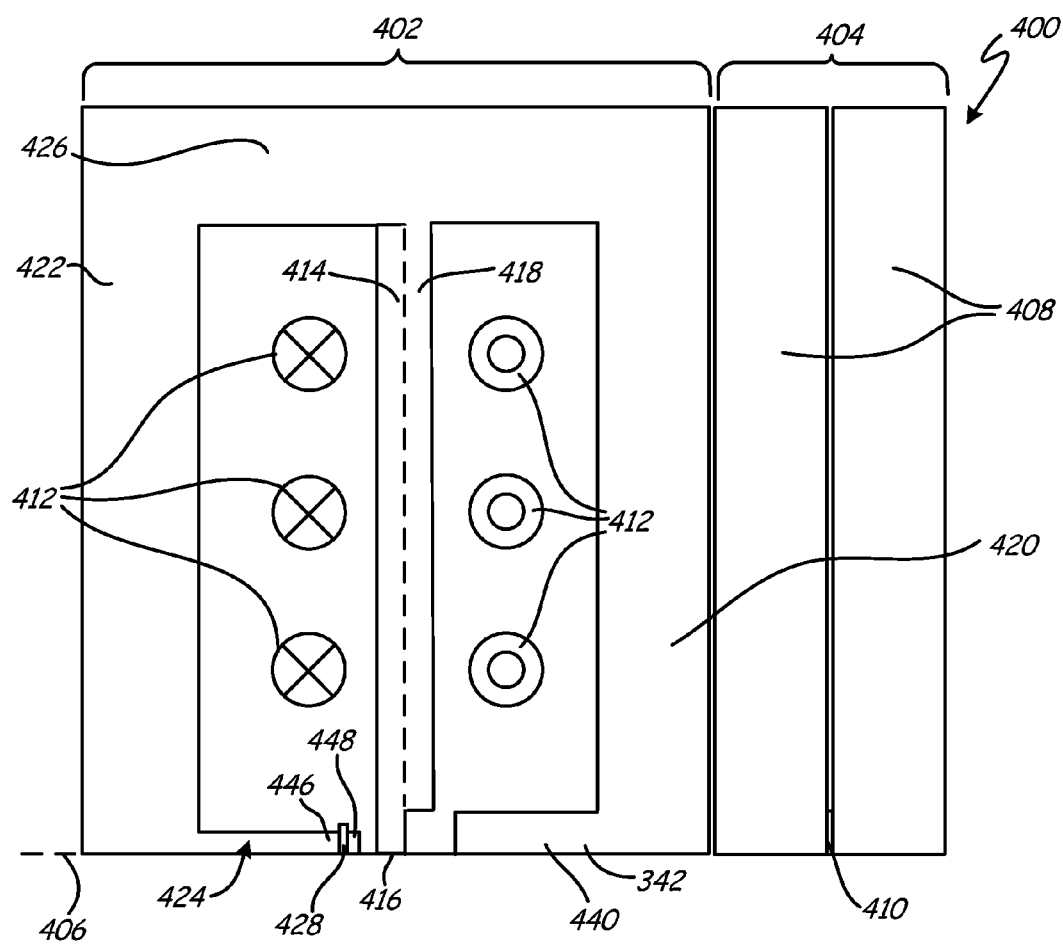
FIG. 7 is a schematic side view of an embodiment of the transducing head.
Figure 8:
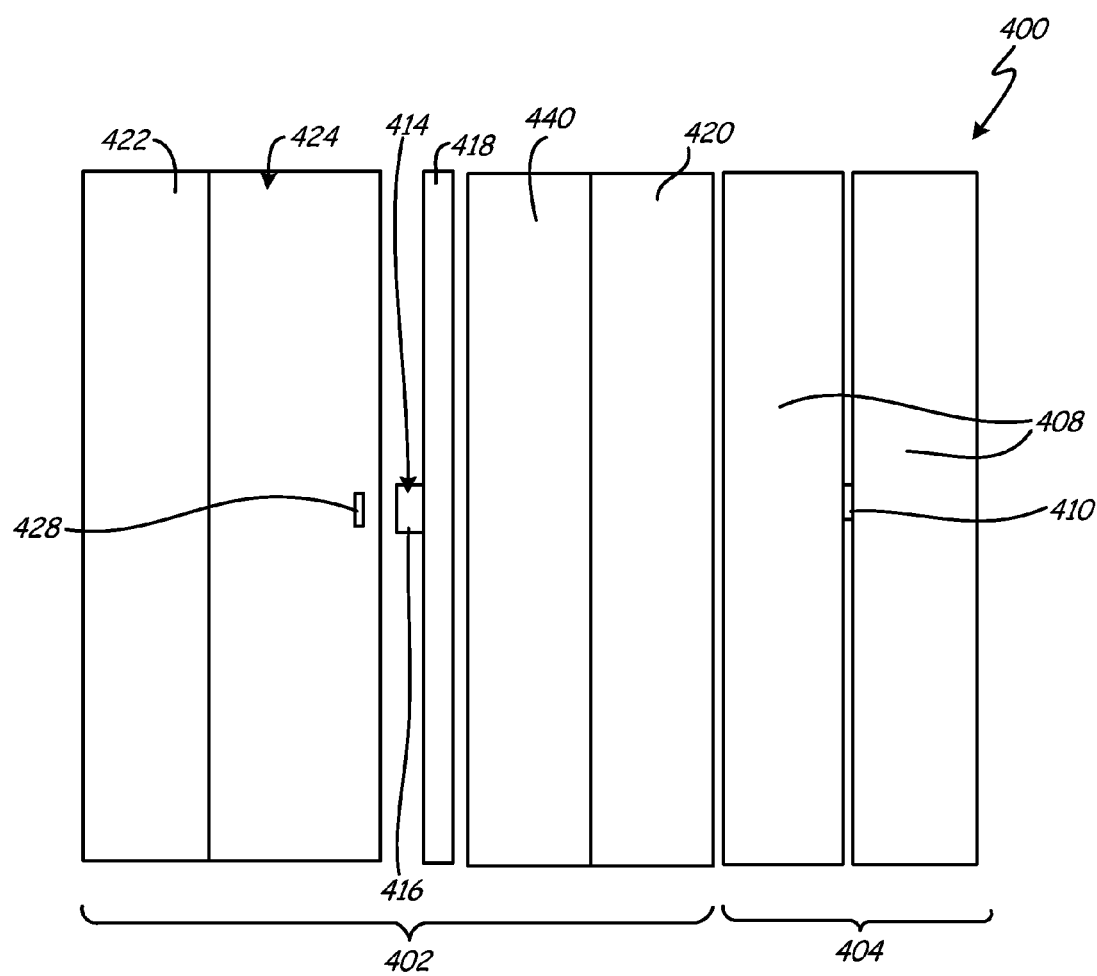
FIG. 8 is an ABS view of the embodiment of the transducing head of FIG. 7.

FIG. 7 is a schematic side view of an embodiment of the transducing head 400, and FIG. 8 is an ABS view of the transducing head 400. Components in the transducing head 400 are generally similar to those of the transducing head 300 described above and are designated with similar reference numbers having numerical values increased by one hundred. However, in the transducing head 400 a synchronization sensor 428 is positioned in between first and second portions 446 and 448 of a front shield 424 and a yoke layer 418 is positioned to face a bottom return pole 420. In the illustrated embodiment, the first and second portions 446 and 448 of the front shield 424 are discontinuous, and abut two opposing sides of the synchronization sensor 428, leaving four sides of the synchronization sensor 428 uncovered by material of the front shield 424. The front shield 424 can provide shielding to the synchronization sensor 428 during operation. The synchronization sensor 428 is closely spaced from a main pole 414 of the writer 402. As illustrated in FIG. 8, the synchronization sensor 428, the main pole 414 and the read sensor 410 are all substantially aligned in a cross-track direction.

Figure 9:
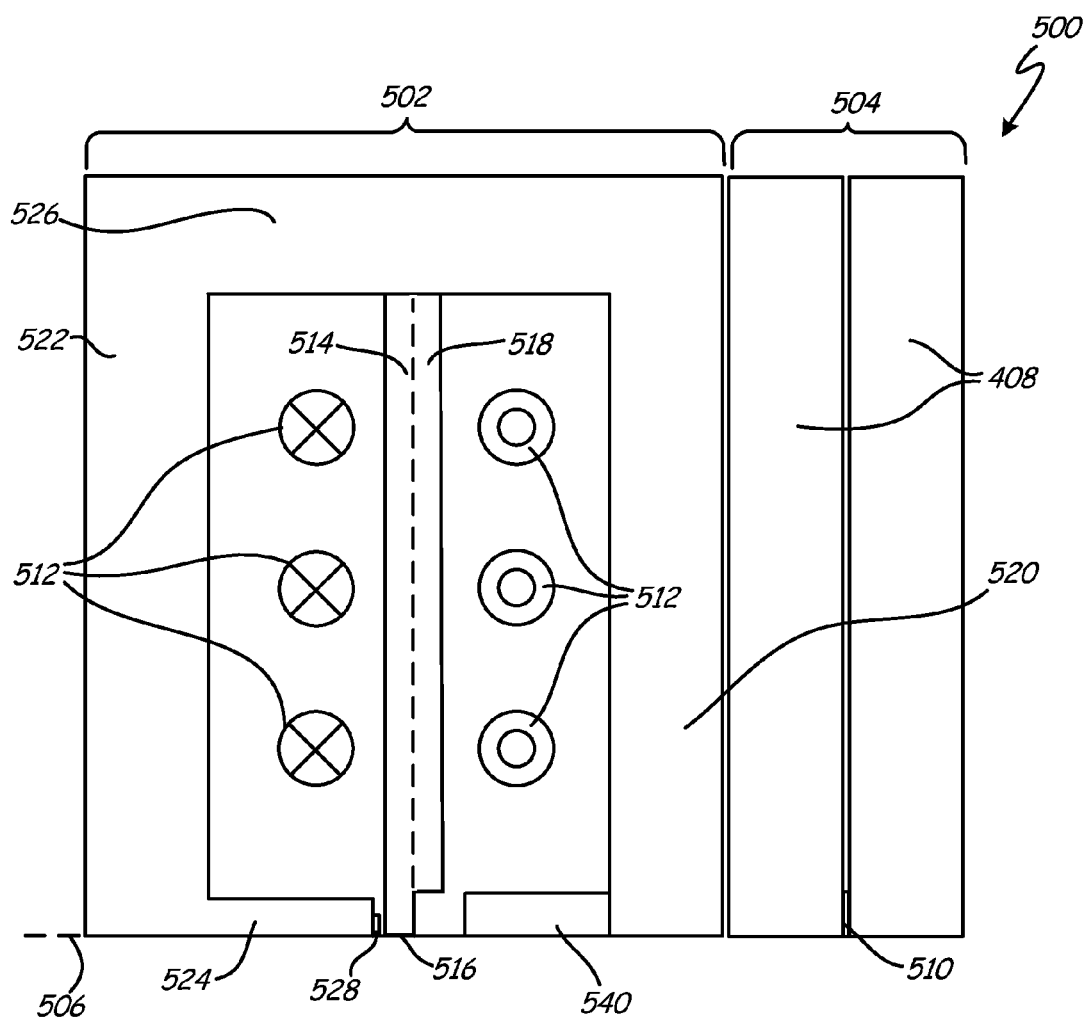
FIG. 9 is a schematic side view of an embodiment of the transducing head.
Figure 10:
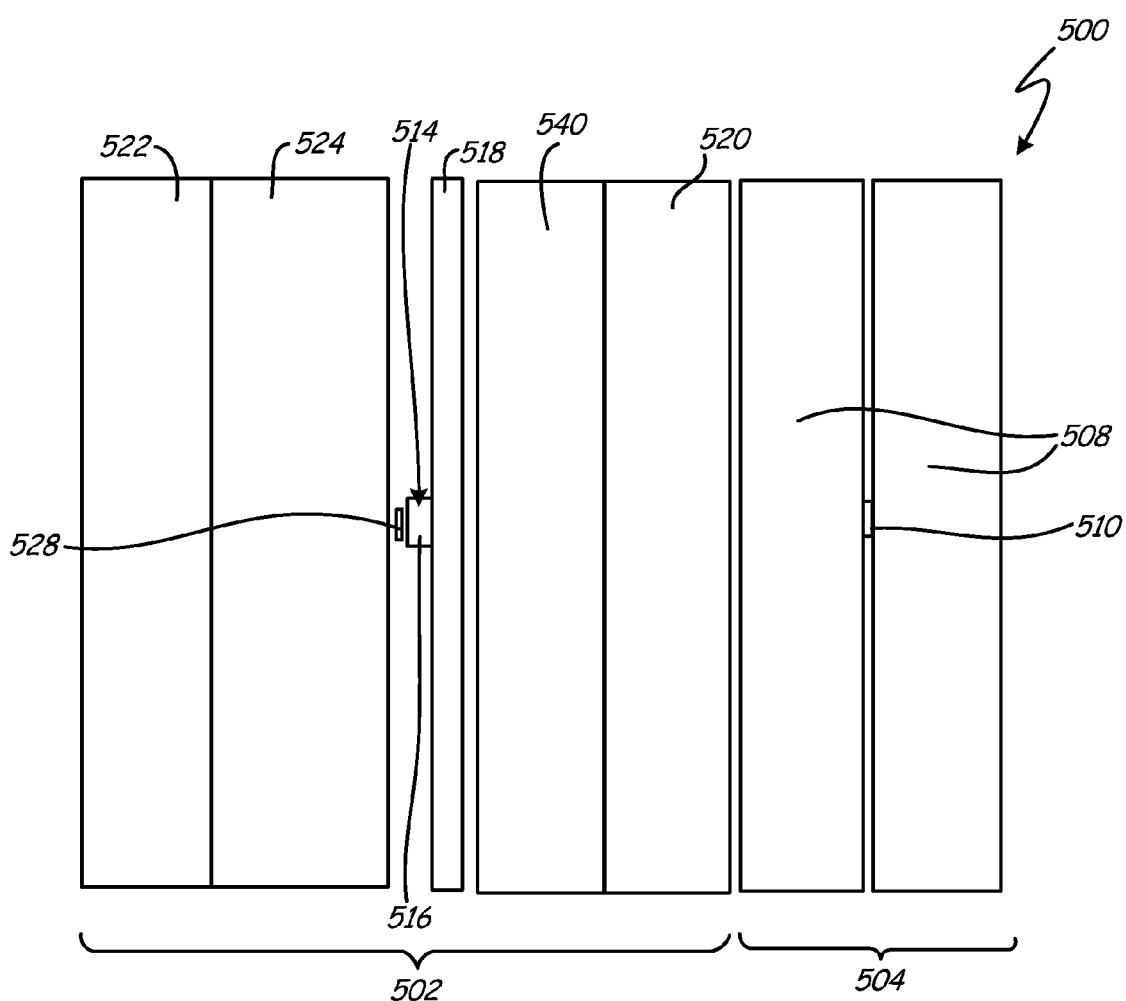
FIG. 10 is an ABS view of the embodiment of the transducing head of FIG. 9.

FIG. 9 is a schematic side view of an embodiment of a transducing head 500, and FIG. 10 is an ABS view of the transducing head 500. Components in the transducing head 500 are generally similar to those of the transducing head 400 described above and are designated with similar reference numbers having numerical values increased by one hundred. However, in the transducing head 500 a synchronization sensor 528 is positioned along the ABS 506 in a write gap in between a main pole 514 of a writer 502 and a front shield 524. The synchronization sensor 528 is closely spaced from the main pole 514 of the writer 502. As illustrated in FIG. 10, the synchronization sensor 528, the main pole 514 and the read sensor 510 are all substantially aligned in a cross-track direction.

Figure 11:
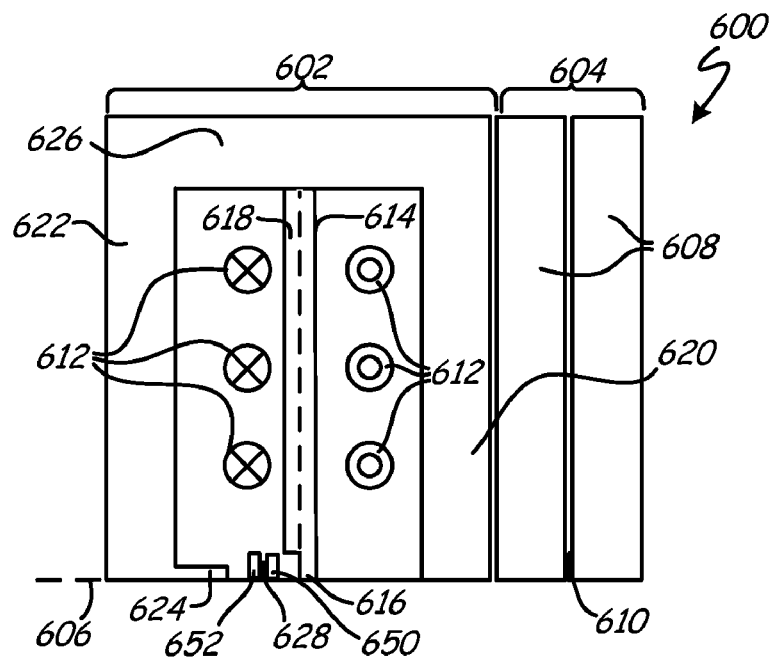
FIG. 11 is a schematic side view of an embodiment of the transducing head.

FIG. 11 is a schematic side view of an embodiment of a transducing head 600. Components in the transducing head 600 are similar to those of the transducing head 500 described above and are designated with similar reference numbers having numerical values increased by one hundred. However, the transducing head 600 lacks a leading shield and further includes first and second shields 650 and 652. A synchronization sensor 628 is closely spaced from a main pole 614 of a writer 602, and is positioned in a write gap in between a front shield 624 and the main pole 614. The first and second shields 650 and 652 are positioned immediately adjacent to opposite sides of the synchronization sensor 628, and in between the front shield 624 and the main pole 614 at the ABS 606. The first and second shields 650 and 652 can extend along the ABS 606 with cross-track lengths comparable to an overall cross-track length of the writer 602.

Figure 12:
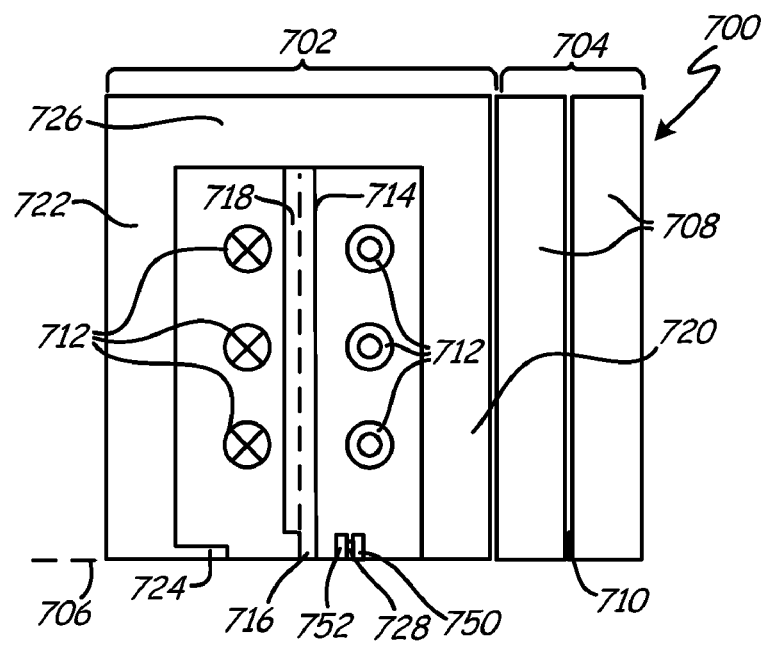
FIG. 12 is a schematic side view of an embodiment of the transducing head.

FIG. 12 is a schematic side view of an embodiment of a transducing head 700. Components in the transducing head 700 are similar to those of the transducing head 600 described above and are designated with similar reference numbers having numerical values increased by one hundred. However, the transducing head 700 includes first and second shields 750 and 752 positioned immediately adjacent to opposite sides of a synchronization sensor 728, and in between a bottom return pole 720 and a main pole 714 of a writer 702 at the ABS 706. The synchronization sensor 728 is closely spaced from the main pole 714 of the writer 702.

Figure 13:
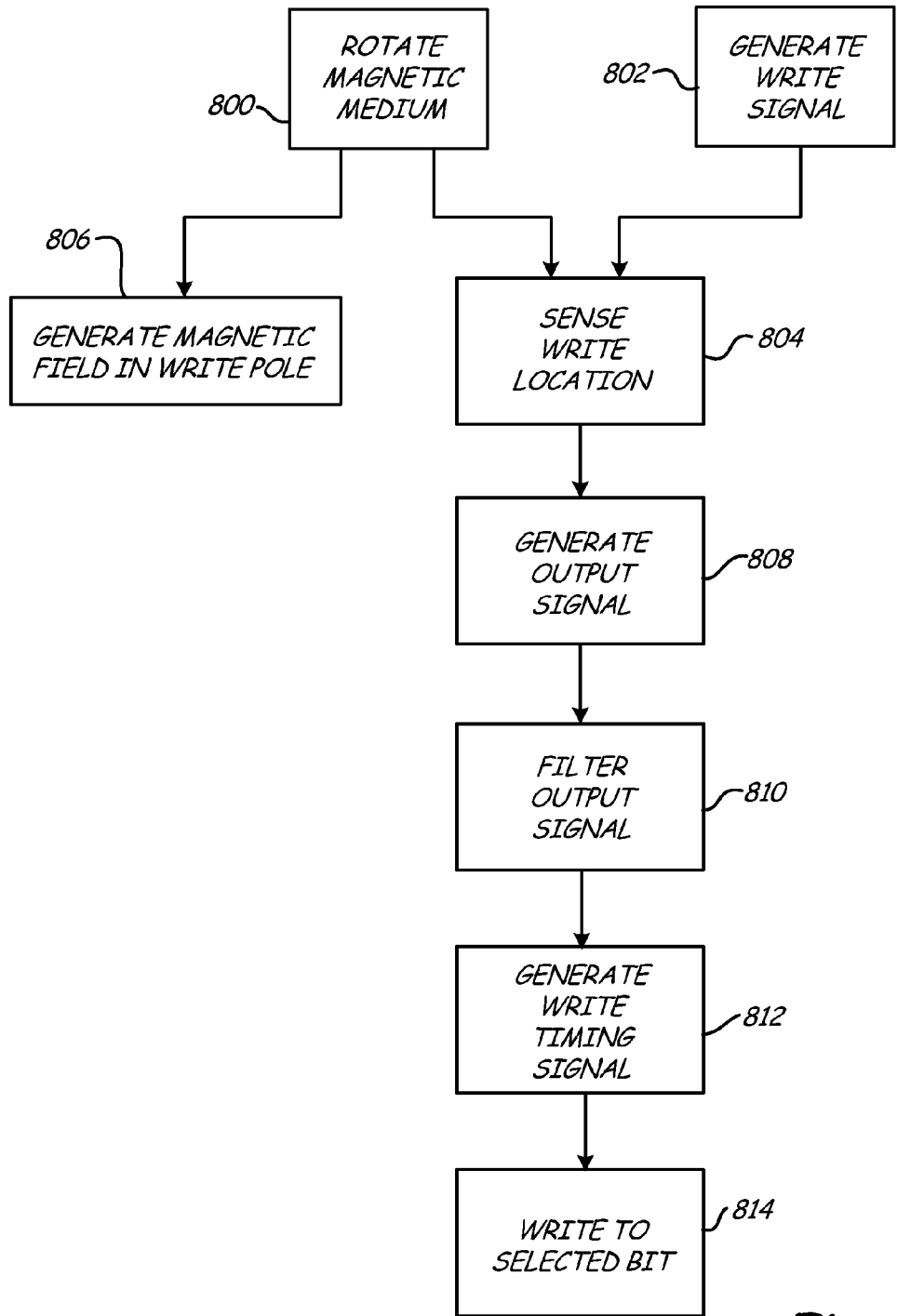
FIG. 13 is a flow diagram showing an example method of writing to a magnetic storage medium according to the present invention.

FIG. 13 is a flow diagram showing an exemplary method of writing to a magnetic storage medium according to the present invention. Initially, a patterned magnetic medium is moved (e.g., rotated) relative to a transducing head with a writer (step 800), and a write signal designating data to be written to the patterned magnetic storage medium (step 802). Steps 800 and 802 can be performed simultaneously, or at different times. After the write signal has been generated at step 802, and while the patterned magnetic storage medium continues to rotate relative to the transducing head, a synchronization sensor can sense a selected write location on the patterned magnetic storage medium by sensing a selected bit or a corresponding timing mark (step 804). The writer can operate at the same time as step 804 occurs, that is, a magnetic field can be generated in a main write pole of the writer (step 806) simultaneously with step 804. The writing at step 806 can be associated with a different location on the patterned magnetic storage medium than the selected location sensed by the synchronization sensor at step 804. In alternative embodiments, the writer can be inactive when the synchronization sensor operates.

The synchronization sensor then generates an output signal based on sensed write location information (step 808). The output signal can then be sent to external circuitry for processing and analysis. Because the synchronization sensor is generally located in a closely-spaced arrangement relative to the main write pole of the writer, information sensed by the synchronization sensor can include not only information relating to the location of the selected bit using for writing timing synchronization, but also information related to magnetization of the main writer pole. Therefore, the output signal can be filtered to remove unnecessary information related to magnetization of the main writer pole (step 810). One example of a suitable filtering process is detailed below. If the writer is not operating simultaneously with the synchronization sensor, then this filtering step may not be necessary.

Next, a write timing signal is generated (step 812), which can be generated as a function of the filtered output signal. The write timing signal allows for precise timing of the arrival of the main writer pole with the selected bit (i.e., the write location), and can produce a desired write timing phase adjustment. By creating a feedback loop in this manner, the system can take into account possible sources of random variation to help improve writing. The writer can then write to the selected bit on the patterned magnetic storage medium as a function of the write timing signal (step 814). The process described above can repeat as desired, with a write signal generated for a next write operation in the manner described with respect to step 802. It should be noted that the write signal for the next write operation can be generated before step 814, and the synchronization sensor can sense the write location for the next write operation during step 814.

Figure 14:
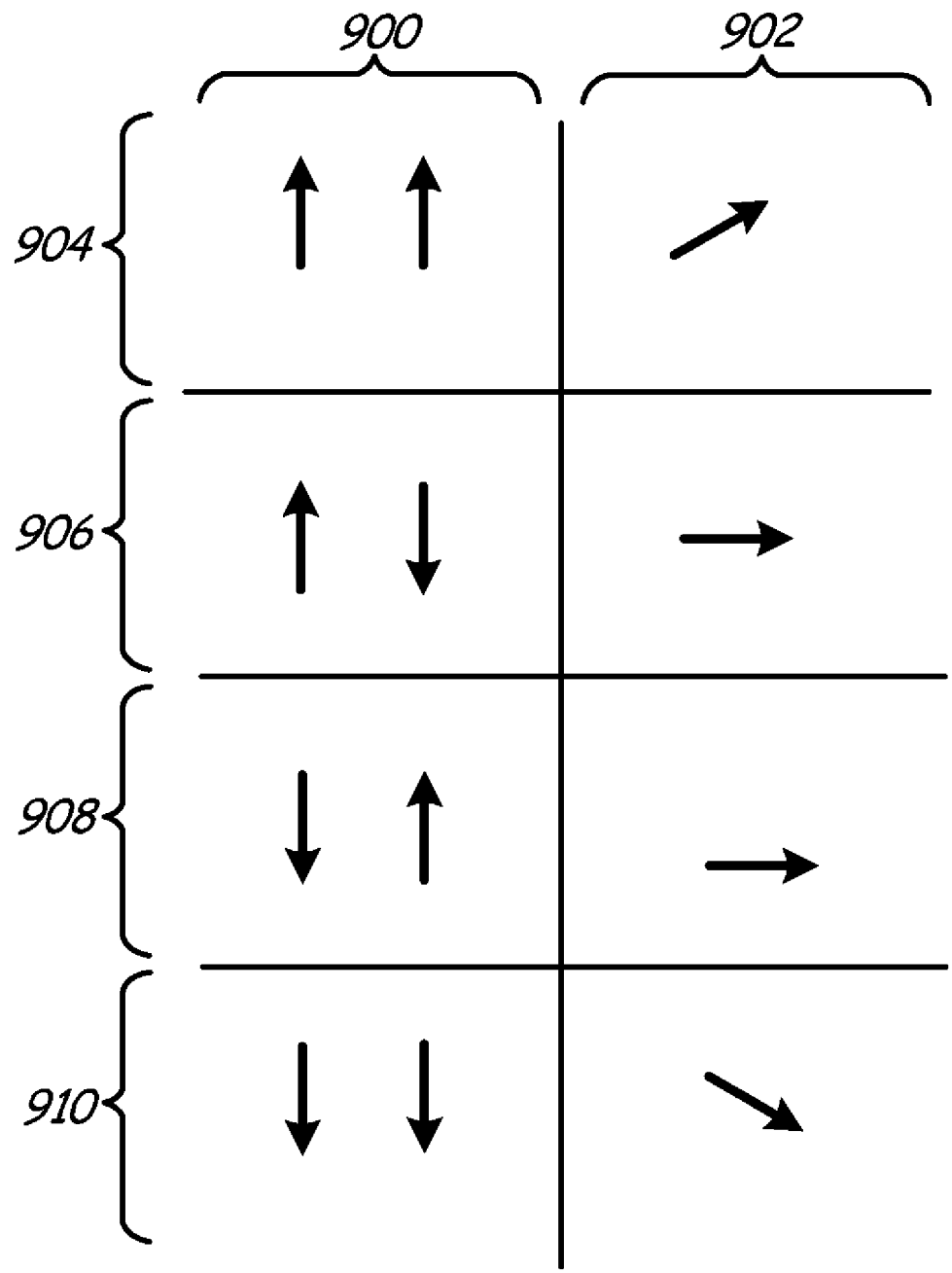
FIG. 14 is a schematic illustration of operative states of an example synchronization sensor for use with the transducing head.

FIG. 14 is a schematic illustration of operative states of an exemplary synchronization sensor for use with a transducing head, useful for understanding a filtering operation for write timing synchronization. FIG. 14 shows a grid having a first column 900 and a second column 902, and a number of rows. The first column 900 illustrates a pair of magnetization vectors, with a left-hand one representing a selected bit (or timing mark) on a patterned magnetic storage medium and a right-hand one representing magnetization of a main writer pole. Each magnetization vector will generally be binary, that is, each magnetization vector will indicate one of only two possible magnetization directions, which are shown in the illustrated embodiment as being parallel to each other. The second column 902 illustrates a state of a synchronization sensor when the synchronization sensor is positioned to simultaneously sense both the magnetization vectors associated with the first column 900.

A first row 904 in the grid illustrates a first possible state of the synchronization sensor in the second column 902 associated with both of the magnetization vectors in the first column 900 being oriented in a first direction. Second and third rows 906 and 908 in the grid illustrate a second possible state of the synchronization sensor in the second column 902 associated with the magnetization vectors in the first column 900 being oriented in substantially opposite directions. A fourth row 910 in the grid illustrates a third possible state of the synchronization sensor in the second column 902 associated with both of the magnetization vectors in the first column 900 being oriented in a second direction that is opposite the first direction shown in the first row 904. The state of the synchronization sensor shown in the second column 902 thus conveys a combined effect of both the selected bit (or timing mark) of the patterned magnetic storage medium and the magnetization of the main writer pole on the synchronization sensor. The orientation of the right-hand magnetization vector in the first column 900 representing magnetization of a main writer pole will always be known, because writer operation will be in response to known command signals (e.g., step 802 in FIG. 13). The existing magnetization of the selected bit (or timing mark) may also be known. An output signal representing the state of the synchronization sensor shown in the second column 902 can therefore be filtered as a function of the known command signals to the writer, in order to isolate information related to a location of the selected bit and remove any impact on the synchronization sensor due to writer operation. This allows for a location of the selected bit to be determined relatively precisely for write timing synchronization.

Although the present invention has been described with reference to preferred embodiments, workers skilled in the art will recognize that changes may be made in form and detail without departing from the spirit and scope of the invention. For example, a transducing head according to the present invention can include additional components not specifically shown or described above. One or more additional synchronization sensors can be provided, for instance, with synchronization sensors positioned at either the same or opposite sides of a main pole of a writer. In addition, certain components shown and described above, such as a reader, can be omitted in alternative embodiments of the transducing head. Moreover, though reader embodiments described above include two return poles, it should be recognized that other writer configurations are possible in accordance with the present invention, such as designs with only a single return pole. Furthermore, relative positioning of components can vary from those shown in the illustrated embodiments. For instance, a reader, main writer pole and synchronization sensor can be aligned or unaligned with respect to each other as desired for particular embodiments. Furthermore, those of ordinary skill in the art will recognize that the present invention can be used for applications other than BPM recording, such as for contact detection, by utilizing an optical or thermal sensor instead of a magnetic synchronization sensor.

The invention claimed is:

1. A magnetic device for writing information to and reading information from a magnetic medium, wherein the magnetic medium includes a plurality of discrete magnetic bits, the magnetic device comprising:
   a read sensor;
   a writer including a write element, a first return element magnetically coupled to the write element, and a second return element magnetically coupled to the write element, wherein the write element is positioned in between the first and second return elements; and
   a synchronization sensor located adjacent to the write element and within of the writer, the synchronization sensor configured to generate a signal as a function of a sensed magnetic bit, wherein the signal is used to position the writer element relative to the sensed magnetic bit.

2. The device of claim 1, wherein the synchronization sensor is located in between the first and second return elements.

3. The device of claim 1 and further comprising:
   a shield extending from the first return element, wherein the synchronization sensor is located between a first portion and a second portion of the shield.

4. The device of claim 3, wherein the shield substantially surrounds five sides of the synchronization sensor.

5. The device of claim 1 and further comprising:
   a shield extending from the second return element, wherein the synchronization sensor is located between a first portion and a second portion of the shield.

6. The device of claim 1 and further comprising:
   a pair of synchronization sensor shields positioned at either side of the synchronization sensor.

7. The device of claim 6 and further comprising:
   a first shield extending from the first return element; and
   a second shield extending from the second return element.

8. The device of claim 1, wherein the synchronization sensor comprises a magnetoresistive sensor.

9. The device of claim 1, wherein the synchronization sensor comprises a Hall effect sensor.

10. The device of claim 1, wherein the write element is substantially aligned with the synchronization sensor in a cross-track direction.

11. The device of claim 10, wherein the read sensor is substantially aligned with the synchronization sensor in a cross-track direction.

12. A magnetic device for writing information to and reading information from a magnetic medium, wherein the magnetic medium includes a plurality of discrete magnetic bits, the magnetic device comprising:
   a read sensor;
   a writer including a write element, a return element magnetically coupled to the write element, and a shield extending from the return element toward the write element; and
   a synchronization sensor disposed in the shield and configured to generate a signal as a function of a sensed magnetic bit, wherein the signal is used to position the writer element relative to the sensed magnetic bit.

13. The device of claim 12 and further comprising:
   an additional return element, wherein the write element is positioned in between the return elements.

14. The device of claim 13 and further comprising:
an additional shield extending from the additional return element.

15. The device of claim 12, wherein the shield substantially surrounds five sides of the synchronization sensor.

16. The device of claim 12, wherein the synchronization sensor is of a type selected from the group consisting of a magnetoresistive sensor, a Hall effect sensor, and an extraordinary Hall effect sensor.

17. The device of claim 12, wherein the write element is substantially aligned with the synchronization sensor in a cross-track direction.

18. The device of claim 17, wherein the read sensor is substantially aligned with the synchronization sensor in a cross-track direction.

19. A method of writing data to a patterned magnetic medium that includes a plurality of discrete magnetic bits, the method comprising:
producing relative movement of a transducing head with respect to the patterned magnetic medium;
sensing a location of a selected one of the plurality of discrete magnetic bits with a synchronization sensor in the transducing head;
inducing a magnetic field in a writer in the transducing head according to a write signal simultaneously with the step of sensing a location of a selected one of the plurality of discrete magnetic bits with a synchronization sensor, wherein the magnetic field induced by the writer is sensed by the synchronization sensor along with the location of a selected one of the plurality of discrete magnetic bits;
generating an output signal as a function of information sensed by the synchronization sensor;
filtering the output signal as a function of the write signal to isolate the sensed location of the selected one of the plurality of discrete magnetic bits; and
writing to the selected one of the plurality of discrete magnetic bits as a function of the filtered output signal.

20. The method of claim 19, wherein the step of sensing a location of a selected one of the plurality of discrete magnetic bits with a synchronization sensor in the transducing head and the step of writing to the selected one of the plurality of discrete magnetic bits as a function of the write timing information within a single pass of the transducing head over the selected one of the plurality of discrete magnetic bits of the patterned magnetic medium.

\* \* \* \* \*